No. 708,385. Patented Sept. 2, 1902.
L. McCONNELL.
NUT LOCK.
(Application filed May 10, 1902.)
(No Model.)
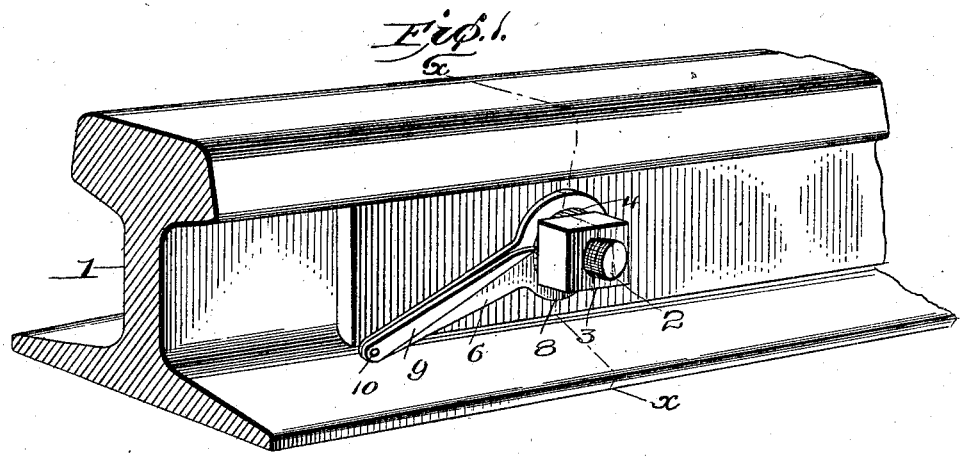
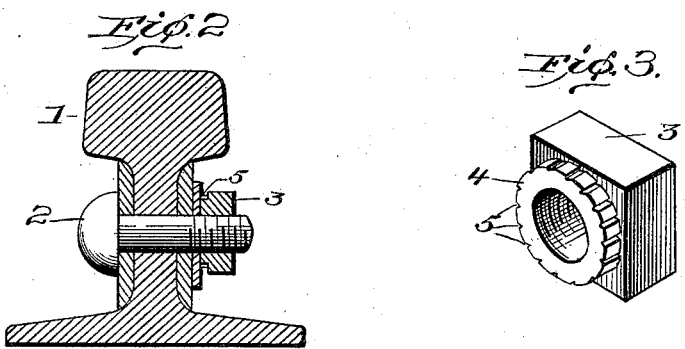
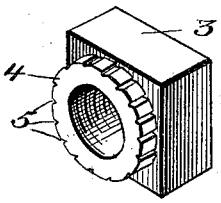
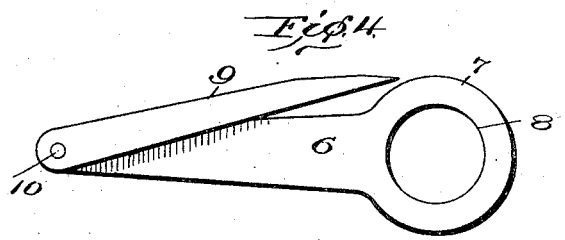
Witnesses:
J. M. Fowler Jr.
Geo. A. Franklin
Inventor
Leslie McConnell
by Henry N. Copp
his Atty.

UNITED STATES PATENT OFFICE.

LESLIE McCONNELL, OF BREWTON, ALABAMA.

NUT-LOCK.

SPECIFICATION forming part of Letters Patent No. 708,385, dated September 2, 1902.

Application filed May 10, 1902. Serial No. 106,790. (No model.)

*To all whom it may concern:*

Be it known that I, LESLIE MCCONNELL, a citizen of the United States, residing at Brewton, county of Escambia, and State of Alabama, have invented certain new and useful Improvements in Nut-Locks, of which the following is a specification.

My invention relates to nut-locks of the pawl-and-ratchet type.

The object of the present invention is the provision of an improved and novel nut-lock of the class described of simple and inexpensive construction which will be durable and satisfactory in use and capable of convenient application to an ordinary bolt without necessitating changes in the latter, while providing for tightening of the nut to any desired degree or rapid loosening thereof.

The invention is embraced in the construction set forth hereinafter in the specification and claims.

In the accompanying drawings, Figure 1 is a perspective view of the invention applied to a rail; Fig. 2, a section on line $x\,x$ of Fig. 1; Fig. 3, a detail of the nut, and Fig. 4 a detail of the arm and pawl.

An ordinary rail is shown at 1, and 2 is a screw-threaded bolt of usual construction.

The nut 3 is provided on its inner face with an annular hub 4, having ratchet-teeth 5 on its periphery, said hub being concentric with the bolt by preference.

The numeral 6 designates an arm provided with a preferably integral washer 7 at one end, whose opening 8 is of sufficient size to receive the bolt and is positioned thereon between the ratchet-hub 4 and the web of the rail 1.

At 9 there is shown a pawl which is pivoted to the arm 6 at 10, and the point at the free end of the pawl is adapted to rest on and engage with the ratchet-teeth 5 by the gravity of said pawl.

In applying the device to a bolt, as shown in the drawings, the washer 7 is slipped over the bolt and up against the web of the rail 1 and the lower end of the arm 6 allowed to rest on the base of the rail. The nut is then screwed on the bolt and the point of the pawl allowed to rest on the teeth 5. On tightening the nut the point of the pawl will rise and fall on the teeth 5 and hold the nut locked wherever adjusted. To remove the nut, it can be tightened slightly, the pawl raised by hand, and the nut unscrewed. It will be understood that the engagement of the lower end of the arm with the base of the rail prevents turning of the washer or loosening of the pawl when the device is in use. The end of the pawl by lying between the face of the nut and the washer is prevented from working out of place in case of vibration or from getting loose at its pivotal connection.

In using the device on a wooden structure or other place a nail can be driven or other suitable stop used to support and form an abutment for the lower end of the arm 6.

Over other constructions of this general type heretofore known to the art my invention possesses the advantage of an unlimited range of adjustment of the nut owing to the employment of the ratchet-hub.

Having thus described my invention, what I claim as new, and desire to secure by Letters Patent, is—

1. A nut-lock comprising a bolt, a nut on the bolt having an annulus of ratchet-teeth, an arm having a washer encircling the bolt, said arm being held against backward movement, and a pawl pivoted to the arm and adapted to engage the annulus of ratchet-teeth.

2. A nut-lock comprising a bolt, a nut on the bolt having an annular hub on one side which is provided with ratchet-teeth, an arm having a washer encircling the bolt, said arm being held against backward movement, and a pawl pivoted to the arm and adapted to engage the ratchet-teeth aforesaid.

In testimony whereof I hereunto affix my signature in presence of two witnesses.

LESLIE McCONNELL.

Witnesses:
F. S. HORTON,
O. F. LUTTRELL.